Figure 1:
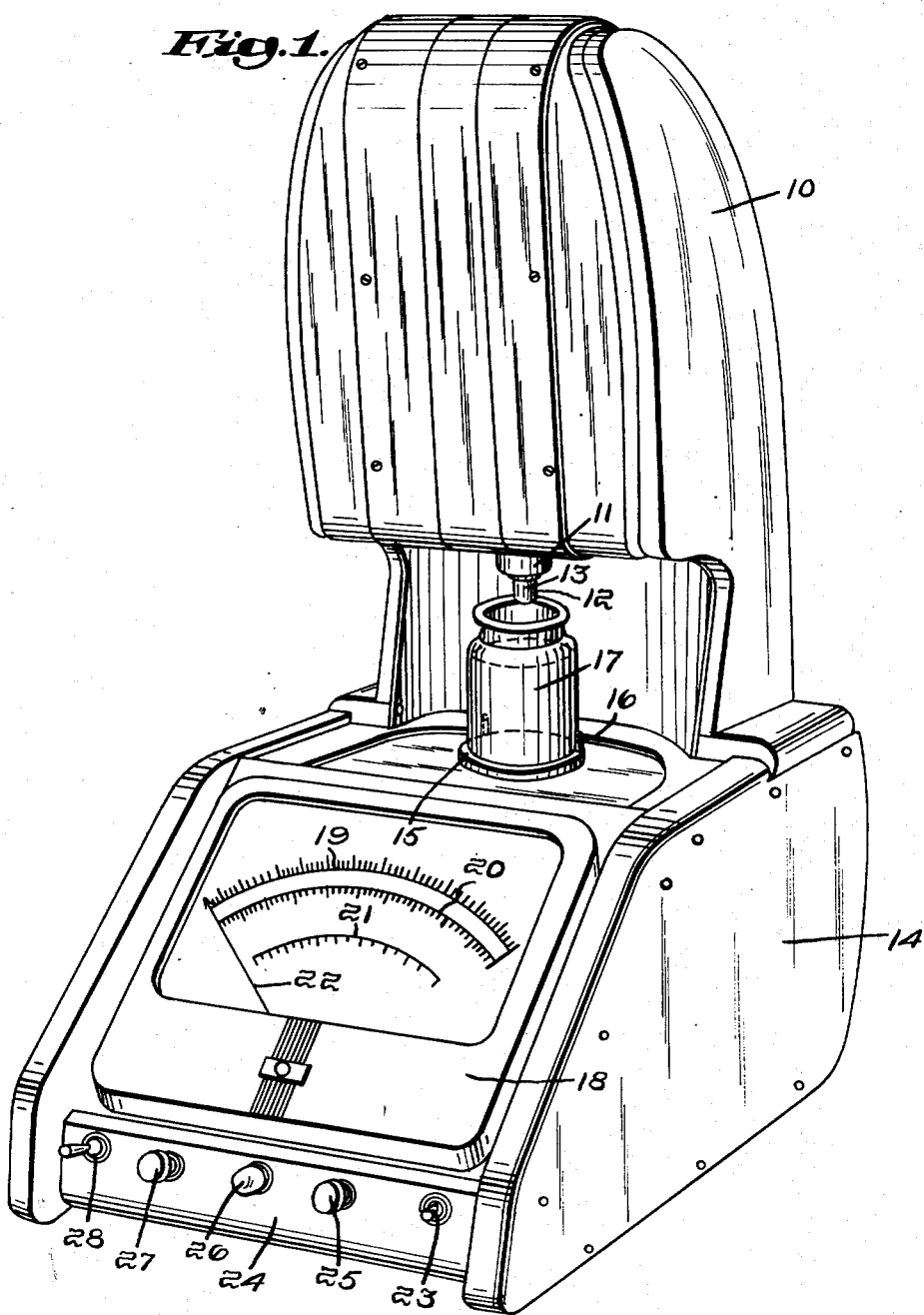

May 19, 1953     J. S. WILSON     2,638,779
APPARATUS FOR DETERMINING CONSISTENCY OF MATERIALS
Filed Aug. 20, 1949     4 Sheets-Sheet 1

Inventor:
James S. Wilson,

May 19, 1953  J. S. WILSON  2,638,779
APPARATUS FOR DETERMINING CONSISTENCY OF MATERIALS
Filed Aug. 20, 1949  4 Sheets-Sheet 3

Inventor:
James S. Wilson,
Attorney

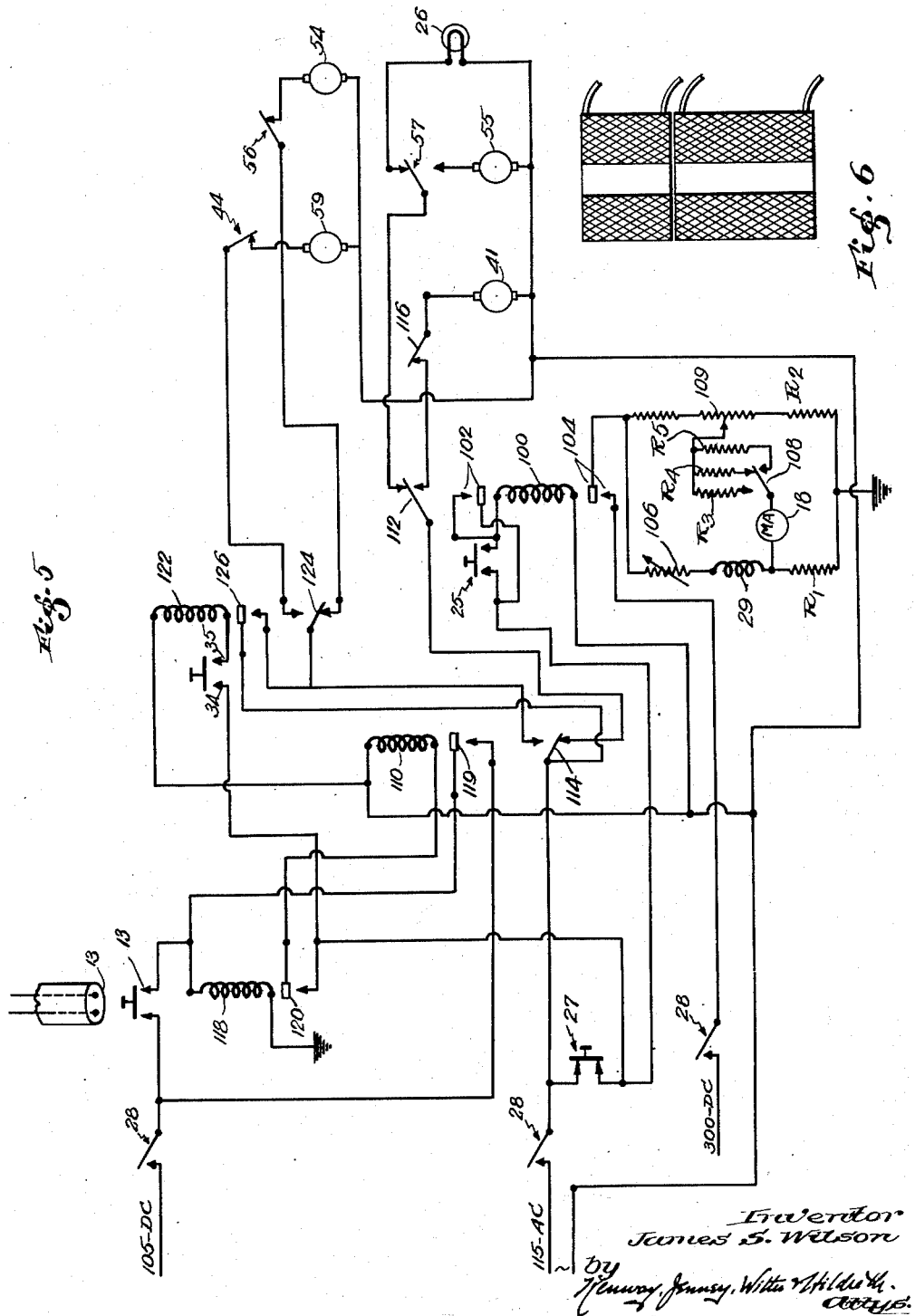

Patented May 19, 1953

2,638,779

UNITED STATES PATENT OFFICE 2,638,779

APPARATUS FOR DETERMINING CONSISTENCY OF MATERIALS

James S. Wilson, Brookline, Mass.

Application August 20, 1949, Serial No. 111,531

6 Claims. (Cl. 73—57)

This invention relates to the testing and measuring of materials, and more particularly to means for testing a substance by determining the resistance of such substance to the force of another body acting thereon.

In the past, devices employed for determining the consistency of a substance by measuring the resistance thereof to an applied force have been slow in operation, lacking in accuracy and reproducibility of determinations, and dependent in large degree upon the skill of the operator.

An object of this invention is to provide an improved means for measuring the consistency of a substance by determining its resistance to the force of another body acting thereon. Another object is to provide a means whereby such determinations may be made rapidly, accurately, and in reproducible fashion.

In accordance with the invention there is provided a movable member adapted to be suspended by a variable force. The member is first brought into contact with a test sample; then the suspending force is reduced until the member has moved a predetermined distance, depressing the surface of the test sample. The reduction in the suspending force required for the predetermined movement of the member is measured as an indication of the consistency of the material tested.

While this invention may be used in many fields, and for the testing of many materials and substances, the invention is specifically disclosed herein with respect to an instrument for measuring the consistency of gelatin. As illustrated herein, this instrument embodies a vertically disposed hollow electromagnet and a vertically movable plunger in said electromagnet. The electromagnet is arranged to receive electric current to produce flux tending to support the plunger. Means is provided for reducing the plunger supporting flux whereby the plunger moves downwardly relative to said electromagnet and against the substance being measured, and means is provided for indicating the amount of mechanical resistance of the substance to the body contact force imparted thereto by said plunger. In the instrument disclosed herein, the plunger-supporting flux is reduced by reducing the current in the electromagnet and the amount of current reduction in the electromagnet is determined as a function of the mechanical resistance of the substance to the force applied by the plunger.

Figure 2:
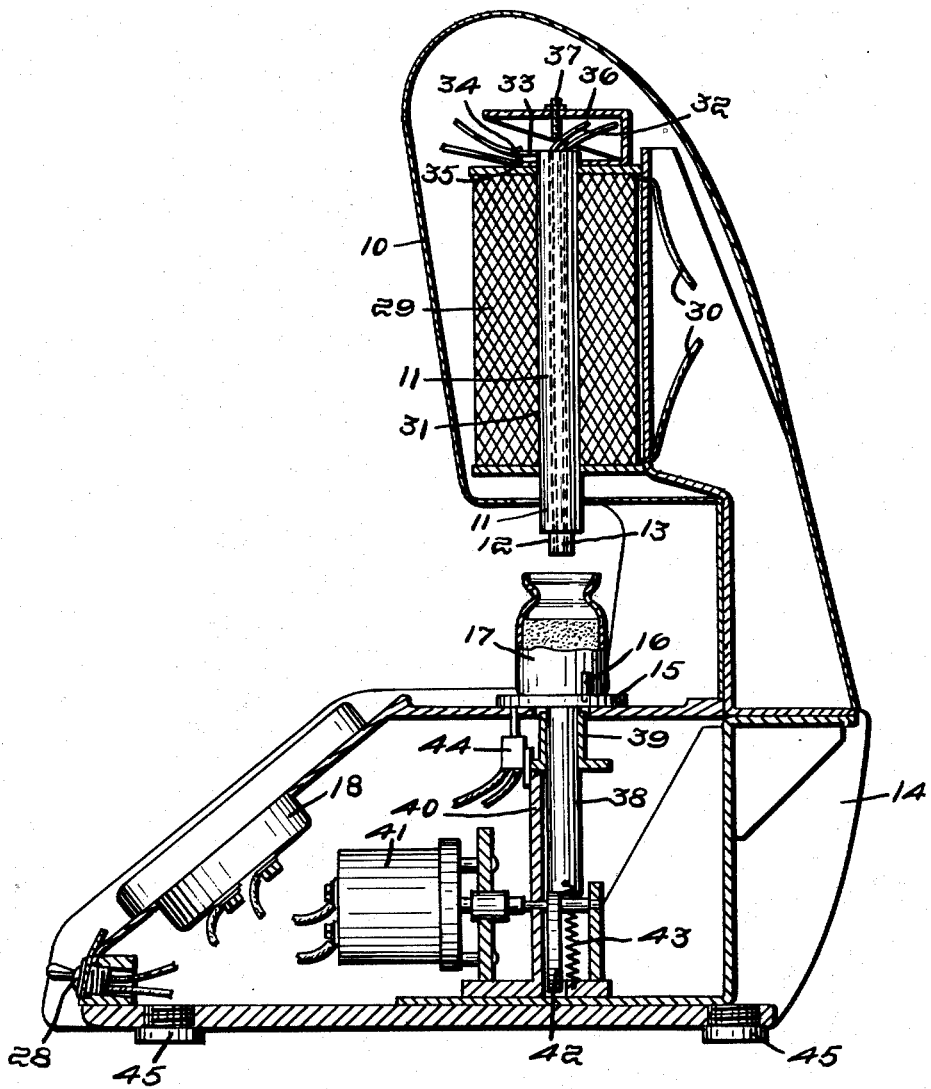
Figure 3:
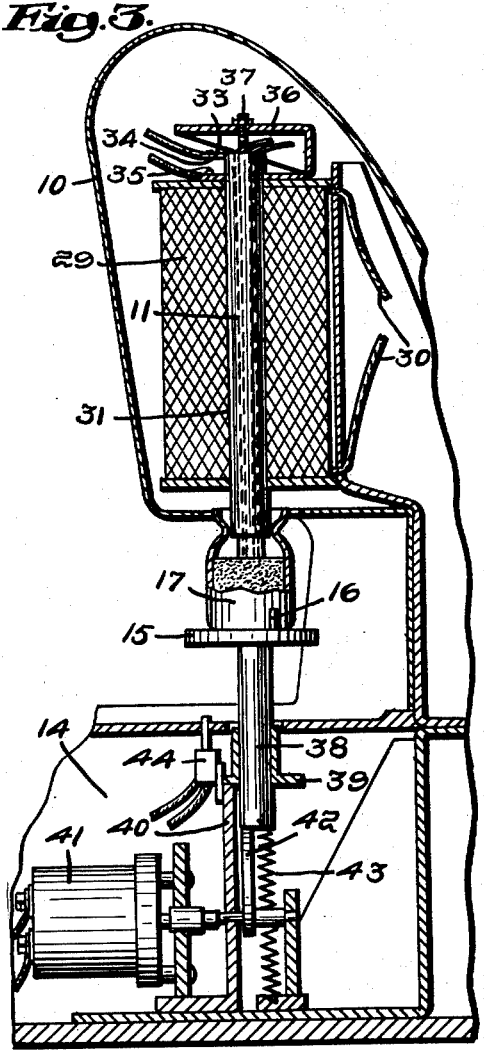
Figure 4:
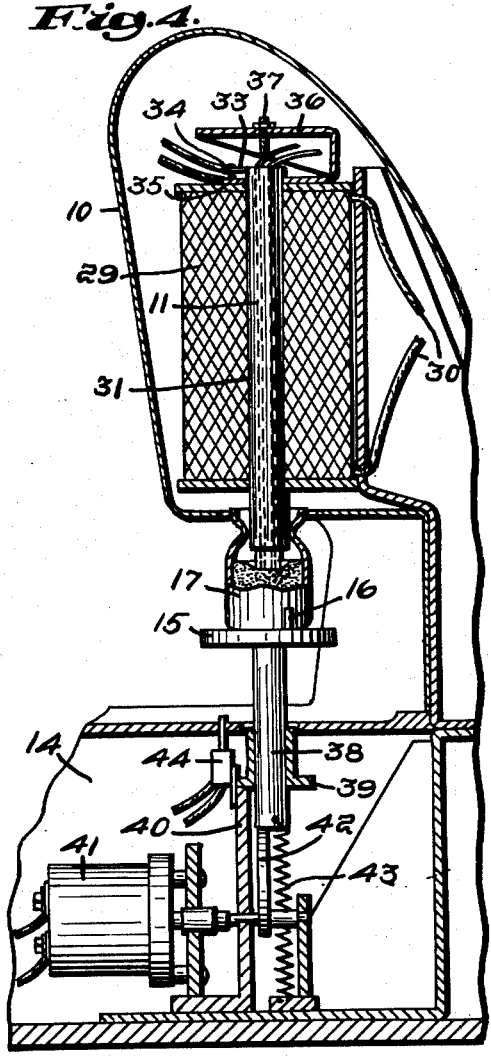

In the drawings,

Fig. 1 is a general perspective view of an illustrative embodiment of this invention in the form of an instrument for testing gelatin, Fig. 2 is a view in vertical central section, front to back, of the instrument of Fig. 1, omitting electrical connections, and showing the plunger and sample-supporting bulb in their out-of-operation positions, Fig. 3 is a fragmentary vertical section of the instrument, similar to Fig. 2, showing the plunger, table and sample in position ready to test, Fig. 4 is a fragmentary vertical section similar to Fig. 3 showing the parts in the position of completed test, Fig. 5 is a schematic diagram of the whole instrument, including the electrical connections, and Fig. 6 is a view in side elevation of a two part coil suitable for incorporation in a machine constructed in accordance with my invention.

In the drawings, the instrument has an upper housing 10 containing a plunger 11, with a contact tip 12 on the lower end thereof. In the contact tip 12 are electric contacts 13 which are connected by the gelatin when they touch the surface thereof. The purpose of these contacts is to indicate when the material under test is engaged by the contact tip 12.

The plunger 11 is formed as a solid cylinder, except for lead line openings for electrical connections from the end contacts 13, and is formed of material which is susceptible to attraction by magnetic flux. The contact tip 12 is a cylinder of electrically non-conductive material such as a plastic, for example methyl methacrylate mounted in the lower end of the plunger 11, and the contacts 13 are mounted in the tip 12 with their ends flush with the free end of the plunger 11 so that as the gelatin contacts the end of the contact tip 12, electrical connection is made by the gelatin surface, between the contacts 13.

When non-conductive materials are being tested, the electrical contacts in the tip 12 may be formed so that a slight pressure by the material is enough to close the contacts. This pressure has no effect on any of the test readings since it is a constant for all tests and effectively is cancelled out in the comparison of readings. In the structure shown, the contact pressure between the gelatin and the contacts 13, is minute.

Contact tips and contacts therein of different form or material may be substituted for the plastic tip 12 and its contacts 13, as may become necessary or desirable in order properly to test a particular material.

The instrument also has a lower housing portion 14 having a table 15 mounted thereon, with locating pins 16 on the table as an aid in positioning a bottle 17 containing a body of gelatin to be tested. An electric meter 18 is mounted in the lower housing 13, which may be graduated for reading in grams as a measure of the resistance of the gelatin to pressure by the plunger, and operable as a milliammeter reading the current in the coil. A plurality of scales are shown in the meter, as at 19, 20, and 21, with a pointer 22 for cooperating therewith. Each of the scales is used separately for a particular range of values.

The shift from one scale to another may be made by shifting the range switch 23.

The shape and dimensions of the plunger tip are factors of importance inasmuch as variations in size will change the force per unit area acting on the surface of the gelatin. It is therefore possible to extend the scope of the machine over an extremely wide range by providing several tips of different diameters and a reference table correlating the three meter scales with the various plunger tips.

A control panel 24 is located below the meter 18 and, in addition to the range switch 23, there is mounted thereon a starting or operation button 25, signal lamp 26, which lights when the instrument is ready for the operation button to be used, a reset button 27, and a power switch 28.

Fig. 2 shows some of the internal structure of the instrument, including the solenoid type coil 29 with electrical leads 30 extending therefrom. The rest of the structure has more to do with the electrical circuit arrangements of the device and while omitted here and in Figs. 3 and 4, to avoid confusion, it is fully indicated in the schematic arrangement of Fig. 5.

The coil 29 has an opening 31 extending vertically and centrally therethrough, and the plunger 11 is located in said opening, to be supported therein by magnetic flux when electric current is applied to the coil. The manner of winding the coil 29, the size of the wire, the dimensions of the coil, and the material, weight, and dimensions of the plunger 11 as well as the voltage applied to the coil, are all considerations of design for application to a particular material to be tested. In any event the design must be such that the coil is able to support the plunger when electric current is passed through the coil. In this instance, 300 volts D. C. is applied to the coil and the plunger is supported in the coil by the magnetic flux thus created in the opening through the coil.

The coil 29 may be wound as a single coil or in the form of two or more coils in series or parallel. The use of the coil and the ranging of the device so as to utilize full scale on the meter for different conditions influences the type of winding of the coil. When the full weight, or a substantial portion thereof, is needed to penetrate the body or material being tested, a single coil, or a plurality of coils in series may be used. When a part only of the plunger weight is needed, much of the current in the coil is devoted to supporting the unneeded weight of the plunger, and the remaining current is varied to lift and drop the plunger the distance required. Separate coils may be used in this last case, one with invariable current and magnetic flux, and another, with variable current and flux, actually operating the plunger. In either case, a normal range change resistor shifting may be accomplished, as indicated in Fig. 5, to set up full scale reading for the expected range of current used to operate the plunger in any particular instance, that is, for whatever substance is under test.

The plunger 11 contains lead wires 32 extending up therethrough from the contacts 13 in the tip 12, leading to a relay 118 (Fig. 5) which is operated to indicate the contact of the gelatin surface with the bottom of the plunger tip 12.

There are other electrical contacts mounted at the top of the coil 29 for cooperation with a contact arm 33 mounted on and extending laterally from the top of the plunger 11. The arm 33 has, at its outer end, a bottom contact 34 for cooperation with a contact 35 mounted on the top of the coil 29. When the coil is de-energized, the arm 33 mechanically supports the plunger in the coil when the contact 34 rests on the contact 35.

During operation of the instrument, the connection of these contacts is an indication of the lower limit of desired travel of the plunger in the coil. A housing 36 extends above the coil 29 and an adjustable screw 37 is centrally mounted therein as an upper limit for the travel of the plunger in the coil. In the specific embodiment illustrated, a total travel of four millimeters is provided, this distance being the standard of surface depression distance for the gelatin under test. In the testing of gelatin, penetration does not mean a breaking of the surface, although in some substances surface disruption may occur.

In the lower portion 14 of the housing, a table lift arrangement is shown, which operates to lift the sample bottle 17 to present the gelatin into contact with the plunger tip 12. The table 15 is supported on an upright shaft 38 within a guide sleeve 39 which is mounted, in turn, on a fixed upright 40. A reversible electric motor 41 is used to lift the shaft 38 and table 15, by means of a cam 42 rotatable thereby and which engages the lower end of the shaft 38. A spring 43 is secured to the lower end of the shaft 38 to keep the shaft in engagement with the cam. The motor operates in one direction to lift the table, turning the cam 42 in one direction, and operates in the other direction to allow the table to move down under the pulling action of the spring, and as the cam is reversed. A limit switch 44 is provided to terminate the downward movement of the table. Another limit switch 116 (Fig. 5) is used on the table lift arrangement as an upper limit to the movement of the table in the event the instrument is operated without the gelatin on the table, the contact of the gelatin with the lower end of the plunger being the ordinary means of stopping the upward movement of the table. Adjustable rests 45 are provided on the base of the instrument, for levelling purposes.

The arrangement of Fig. 2 shows the instrument in deenergized condition, with the plunger, and lift table at their lowest positions.

The structure of Figs. 3 and 4 is the same as that in Fig. 2, the difference being in the positions of the parts. Fig. 3 shows the instrument with full current on the coil, the plunger at its highest position, and the table lift up so as to engage the contact tip 12 with the surface of the gelatin.

Fig. 4 shows the table lift up and the gelatin still in the position shown in Fig. 3, but with the current reduced in the coil and the plunger dropped down the full four millimeter limit so as to push down the surface of the gelatin and to connect the contacts 34 and 35 to stop the downward movement of the plunger, both electrically and mechanically.

In Fig. 5 there is shown a schematic circuit diagram disclosing the elements and their interconnections in the condition in which they are shown in Fig. 2. It is believed that the operation of the device will be clear from the following description of the operation of the circuit elements.

An appropriate power supply (not shown) is arranged to deliver 115 volts A. C.; 300 volts D. C.; and 105 volts D. C.; and all supply lines are controlled by a master switch 28.

After the master switch 28 has been closed, the next step is to press the starting button switch 25 serving to energize a solenoid 100 and close a set of holding contacts 102 which shunt the switch 25 and maintain the solenoid 100 in energized condition when the button 25 is released. Also closed by the coil 100 is a pair of contacts 104 which connect the magnet coil 29 to the source of 300 volts D. C. through a rotary variable resistor 106 driven in one direction by a motor 54 and in the opposite direction by a motor 55. The ammeter 18 is connected from the junction of the coil 29 and resistance $R_1$ to the slides on the potentiometer 109 through the resistance network $R_3$, $R_4$, and $R_5$ and switch 108. A resistance network $R_3$, $R_4$, $R_5$ controlled by a manually operated three-position switch 108 is connected in series with the meter 18 and with a potentiometer 109, by means of which the different ranges may be selected and calibration effected.

The relay coil 100 also operates a set of contacts 112 normally connected to the A. C. line through a relay contact 114. In the closed position of the relay 100 the contacts 112 are connected through a limit switch 116 to a motor 41 which serves to elevate the table 15 toward the plunger 11. The table 15 continues to move upwardly until the surface of the gelatin touches the contact points 13 and thereby connects a relay coil 118 to the source of 105 volts D. C. Thereupon the coil 118 closes a pair of contacts 120 which control the supply of A. C. to a relay coil 110; the latter operates the contacts 114 to disconnect the table lift motor 41, and the table 15 comes to rest with the plunger 11 in contact with the gelatin. The coil 118 also closes the contacts 119 which shunt the contacts 13 thus removing current from the gelatin surface.

Simultaneously the contacts 114 connect the A. C. line to the motor 54 which drives the variable resistor 106 to reduce the current flowing in the magnet coil 29. The consequent reduction in flux density causes the plunger 11 to move down, depressing the surface of the gelatin, a distance of four millimeters, whereupon the contacts 34 and 35 are closed to supply A. C. to a relay coil 122. Four millimeters has been selected as a standard distance but the contacts 34 and 35 may be spaced apart by any desired amount. The coil 122 operates relay contacts 124 to disconnect the motor 54 and stop the resistor; also the contacts 124 connect in a motor 59 which serves to lower the table 15. A limit switch 44 is included in the line to the motor 59 and operates to open the motor supply circuit when the table reaches a predetermined lowered position.

Simultaneously the coil 122 closes a pair of contacts 126 which serve to supply current to the switch 124 independently of the contacts 114 controlled by the relay coil 110.

At this point the plunger has fallen the predetermined four millimeter distance and the resistor 106 has reduced the magnetic flux by the amount required for the four millimeter drop. The meter 18 then registers the current reduction and holds the reading until further action is taken.

Before another sampling is made a reset button switch 27 is pressed to open the circuit to the relay coil 100. The contacts 102 and 104 then open, the meter 18 returns to zero, and the contacts 112 disconnect the line to the motor 41. The contacts 112 also close the circuit to the motor 55 which then proceeds to drive the variable resistor in reverse direction to its original predetermined setting, whereupon the limit switch 57 operates to disconnect the motor 55 and connect in the indicating lamp 26 thus giving notice that the instrument is in condition to make another test.

To recapitulate, each motor is governed by a limit switch. The switch 116 prevents the motor 41 from raising the table beyond a given limit, the switch 44 prevents the motor 59 from lowering the table too far; the switch 56 limits the travel of the resistor 106 in one direction; and the switch 57 limits its travel in the opposite direction.

The relay coil 100 is energized by the push button switch 25, held in operation by the contacts 102, and de-energized by the reset button switch 27.

The relay coil 110 is energized and de-energized through the contacts 120 of the D. C. relay coil 118. The relay coil 122 is energized through the plunger limit contacts 34 and 35 but is connected in series with the contacts 120 and is therefore deenergized simultaneously with the coil 110.

The D. C. relay coil 118 is initially energized through the plunger contacts 13 but is thereafter held in by a pair of contacts 119 which are closed by the relay 110. Hence the relay coil 118 acts to energize the relay coil 110 which in turn holds the relay 118. Since the push button reset 27 opens the circuits to all three A. C. relays 100, 110 and 122, it also acts, through the relay 110 to open the circuit to the D. C. relay 118.

When the start button 25 is again pressed, the lamp circuit is opened, and the motor 54 drives the resistor 106 until the switch 57 once again connects the motor 55 which then awaits pushing of the reset button 27 before coming into operation.

The essence of the operation is the gradual lowering of the plunger 11 as the resistor 106 is driven to reduce the current flowing in the magnet coil 29. The downward movement of the plunger is opposed by the resistance of the gelatin. In the case of a watery product the reduction in flux density sufficient to bring about the plunger drop of four millimeters is very slight; for an excessively stiff gelatin the magnetic suspending force would have to be reduced practically to zero. Hence the amount by which the magnet coil current is reduced is a measure of the relative stiffness of the product undergoing test.

Although not as practical, it is possible to substitute for the electro-magnet a permanent magnet combined either with a rotatable bucking magnet or a bucking coil connected to produce a force countering that of the principal magnet.

In selecting the elements of the circuit is must be borne in mind that the reduction rate of the magnetic flux is an important factor. If the suspending force be reduced too slowly, the plunger will move jerkily, due to friction, and the performance of the machine will therefore be erratic. Furthermore the gelatin will flow out from beneath the plunger in response to its slow advance; consequently an unduly low consistency reading will be obtained. On the other hand, if the plunger is dropped too fast, its impact on the surface of the gelatin will set up shearing stresses which will disrupt the surface and produce an inaccurate result. In general a rate should be selected which is sufficiently fast to permit a smooth clean downward movement of the plunger.

Although the instrument described above is arranged to suspend a vertical plunger and vary the balance between the weight of the plunger and the magnetic suspending flux, it is within the spirit of the invention magnetically to impel or pull a plunger, utilize a stationary plunger and a moving magnet, or arrange for the plunger to drop freely from suspended position. Moreover a machine may be constructed in accordance with the invention to test various characteristics of a wide variety of materials.

Having thus disclosed my invention what I claim as new and desire to secure by Letters Patent of the United States is:

1. In an instrument for testing a substance by determining its resistance to the force of another body acting thereon, in combination, a vertically disposed hollow electromagnet, a vertically movable plunger disposed in said electromagnet, said electromagnet being arranged to produce a fixed magnetic flux tending to support said plunger within said electromagnet and further arranged to produce a variable plunger-supporting magnetic flux, means for reducing said variable flux until the plunger moves downwardly in controlled fashion a predetermined amount relatively to said electromagnet and against a substance being measured, and means for indicating the total flux reduction and thus the resistance of said substance to the body contact force imparted thereto by said plunger.

2. In an instrument for testing a substance, in combination, a coil of wire, a testing member magnetically supportable within said coil upon application of electric current thereto, an electric current supply circuit connected to said coil, means for presenting the substance to be tested into contact with the lower end of said testing member, means connected to said supply circuit for progressively reducing the current in said coil in order to cause said testing member to move progressively a predetermined distance downward against said substance, means connected to said current reducing means for automatically stopping its operation after the member has moved through said predetermined distance, and means for determining the amount of current reduction in said electromagnet as a function of the resistance of said substance to the force applied thereto by said testing member.

3. In an instrument for testing a substance, in combination, a coil of wire, an electric current supply circuit connected to said coil, a testing member supportable within said coil upon application of electric current to said coil, means for automatically presenting the substance to be measured into contact with the lower end of said testing member, means connected to said circuit for automatically and progressively reducing the current in said coil in order progressively to move said testing member a predetermined distance against the substance being tested, and means connected to said circuit for automatically determining the amount of current reduction in said coil as a function of the resistance of said substance to the force applied thereto by said testing member.

4. In an instrument for testing a substance, in combination, a hollow coil of wire, an electric current supply circuit connected to said coil to produce magnetic flux therein, a plunger susceptible to attraction by magnetic force disposed in said coil and suspendible therein by said flux, means connected to said supply circuit for reducing said flux by reducing said electric current whereby the suspension effect of said flux on said plunger is reduced and said plunger may move downward to provide body contact force for application to the substance being tested, electrical contact means connected to said flux reducing means and carried by said plunger operable upon contact with the substance being tested to initiate the operation of said means for reducing said electric current, and means for indicating the amount of resistance of said substance to the body contact force of said plunger.

5. An instrument for measuring the consistency of gelatin and the like comprising, in combination, a hollow electromagnet, an electric current supply circuit connected to said electromagnet, a plunger susceptible to attraction by magnetic force and movable vertically in said electromagnet under the influence of magnetic flux therein, electrical contact means for producing an indication of the completely suspended position of said plunger in said electromagnet, means connected to said circuit for reducing said flux by reducing the electric current in said electromagnet whereby the suspension effect of said flux on said plunger is reduced and said plunger may move downwardly to provide a body contact force for application to a substance being measured, a support for the substance to be measured disposed beneath said plunger and movable vertically to bring said substance into contact with said plunger, electrical contact means in said plunger connected to said current reducing means and operable upon contact with the substance being tested to initiate the operation of said means for reducing the electric current in the electromagnet, additional electric contact means for indicating a predetermined downward movement of said plunger from the completely suspended position thereof, and means for indicating the consistency of said material by its resistance to said body contact force.

6. Apparatus for determining the relative consistency of materials, comprising an electromagnet, a plunger of magnetizable material disposed in said electromagnet, a circuit connected to said electromagnet for supplying current thereto, means connected to said circuit for automatically varying the current supplied to the electromagnet and thereby causing movement of said plunger, means actuated by said plunger for halting the operation of said current varying means after the plunger was moved a predetermined distance, means for mounting a test sample in contact with said plunger, and means connected to said circuit for measuring and indicating the amount of current variation produced during said predetermined movement of the plunger.

JAMES S. WILSON.

References Cited in the file of this patent

UNITED STATES PATENTS

| Number | Name | Date |
|---|---|---|
| 1,540,979 | Bloom | June 9, 1925 |
| 1,770,046 | Shore | July 8, 1930 |
| 1,826,024 | Roller | Oct. 6, 1931 |
| 2,239,049 | Morris | Apr. 22, 1941 |
| 2,357,856 | Tate | Sept. 12, 1944 |